United States Patent [19]

Peyton et al.

[11] 4,400,864

[45] Aug. 30, 1983

[54] FLUID FILTER

[75] Inventors: Richard H. Peyton, Berkley, Mass.; Donald I. Thornton, Warwick, R.I.

[73] Assignee: Fram Corporation, Providence, R.I.

[21] Appl. No.: 321,310

[22] Filed: Nov. 13, 1981

Related U.S. Application Data

[62] Division of Ser. No. 180,734, Aug. 25, 1980, Pat. No. 4,324,660.

[51] Int. Cl.³ .................. B21D 39/00; B23P 11/00
[52] U.S. Cl. ................................ 29/508; 29/511;
220/66; 220/67; 210/232; 210/440; 210/444; 210/457; 210/DIG. 17
[58] Field of Search ............ 210/130, 131, 136, 232, 210/440, 443, 444, 448, 450, 168, 457, DIG. 17; 29/511, 508, 520; 220/66, 67; 229/5.5, 5.6; 285/382.2

[56] References Cited

U.S. PATENT DOCUMENTS

| 1,761,915 | 6/1930 | Harwood et al. | 210/440 |
| 2,902,162 | 9/1959 | Humbert et al. | 210/438 |
| 3,061,101 | 10/1962 | Humbert | 210/130 |
| 3,204,771 | 9/1965 | Baldwin | 210/443 |
| 3,231,089 | 1/1966 | Thornton | 210/DIG. 17 |
| 3,232,437 | 2/1966 | Hultgren | 210/DIG. 17 |
| 3,260,367 | 7/1966 | Hultgren | 210/130 |
| 3,265,363 | 12/1966 | Eberle | 210/130 |
| 3,321,083 | 5/1967 | Thornton | 210/440 |
| 3,794,170 | 2/1974 | Yamaguchi | 210/DIG. 17 |
| 3,831,264 | 8/1974 | Terrell | 29/517 |
| 3,902,746 | 9/1975 | Brandt | 285/331 |
| 4,021,342 | 5/1977 | Schacht | 210/444 |
| 4,035,306 | 7/1977 | Maddocks | 210/DIG. 17 |
| 4,075,098 | 2/1978 | Paul | 210/DIG. 17 |
| 4,237,015 | 12/1980 | Fearnhead | 210/DIG. 17 |
| 4,314,903 | 2/1982 | Hanley | 210/DIG. 17 |

FOREIGN PATENT DOCUMENTS

| 742050 | 9/1966 | Canada | 210/443 |
| 52-32176 | 3/1977 | Japan | 210/440 |
| 1503295 | 3/1978 | United Kingdom | 210/440 |

Primary Examiner—Ernest G. Therkorn
Attorney, Agent, or Firm—William A. Marvin; Ken C. Decker

[57] ABSTRACT

A fluid filter (10) of the spin-on automotive type has a housing with a unitary closure member (18). The unitary, or one-piece, closure member (18) includes provision for mounting of the filter and for fluid flow therethrough. Two opposed annular flanges (78, 80) of the closure member receive between them the marginal edge (72) of the filter shell in a fluid-tight crimped engagement. This arrangement facilitates manufacture of the filter by providing support to the shell wall (68) during the crimping operation and also provides an exceptionally strong joint between the shell (12) and closure member (18). Another embodiment of the filter has a closure member (18) with a marginal edge (76) having a portion of reduced thickness which facilitates its crimped engagement with the filter shell (12). Methods of making such closure members attain a unitary closure member without welding operations.

3 Claims, 4 Drawing Figures

FLUID FILTER

This is a division, of application Ser. No. 180,734, filed Aug. 25, 1980, now U.S. Pat. No. 4,324,660.

The invention relates to an automotive oil filter. The filter includes a unitary closure member which is permanently joined in fluid-tight manner to the open end of a cup-shaped housing and which cooperates with the cup-shaped housing to form a chamber for holding filter media. The closure member includes openings for fluid flow communication to and from the filter. One of the openings is threaded and the filter is mounted by screwing it on to a threaded stem of an engine.

Filters of this type are commonly referred to as being of the spin-on type and are used generally to filter the lubricating oil of internal combustion engine, particularly automotive vehicle engines. A filter of this type is known in accordance with U.S. Pat. No. 3,231,089 to Thornton, one of the coinventors of the present invention, in which the closure member includes two components which are fastened together. One of the components includes openings for fluid flow communication to and from the filter. One of the openings is threaded for operatively mounting the filter. The other component of the closure member is relatively thin, is welded to the first component, and connects the first component to the cupshaped outer shell of the filter. The other component also carries a resilient sealing member operative upon installation of the filter to complete a closed fluid flow path through the filter.

Manufacture of filters with two-piece closure members requires the formation of the two separate closure member components and usually involves welding these components together before they are joined to the cup-shaped member. The multiplicity of forming and welding operations necessary to form such a closure member contributes substantially to the overall cost of the filter.

The invention as claimed eliminates the welding operation by providing a unitary closure member, and thereby reduces the overall cost of manufacturing the closure member. Further, the invention provides a closure member with a pair of opposed annular flanges which receive between them the marginal edge of the cup-shaped outer shell. The pair of flanges and the marginal edge of the cup-shaped member are crimped together to form a permanent, fluid-tight joint between the members. An alternative embodiment of the invention provides a closure member with a marginal edge having a thin portion which is crimped into engagement with the marginal edge of the cup-shaped member. Both embodiments provide an extremely strong joint between the members because the closure member provides support to the marginal edges during the crimping operation.

The advantages offered by the invention are mainly that the closure member is a unitary or one-piece component; no welding operation is required in its manufacture; the closure member facilitates manufacture of the filter housing because an inner annular flange supports the side wall of the cup-shaped member during the crimping operation; an exceptionally strong joint is formed between the members; and the closure member is formed from a single work piece or blank which is punched from sheet material and performs all of the functions performed by the prior two-piece construction while affording a reduced cost of manufacture.

Three ways of carrying out the invention are described in detail below with reference to drawings which illustrate only these three specific embodiments, in which.

Figure 1:
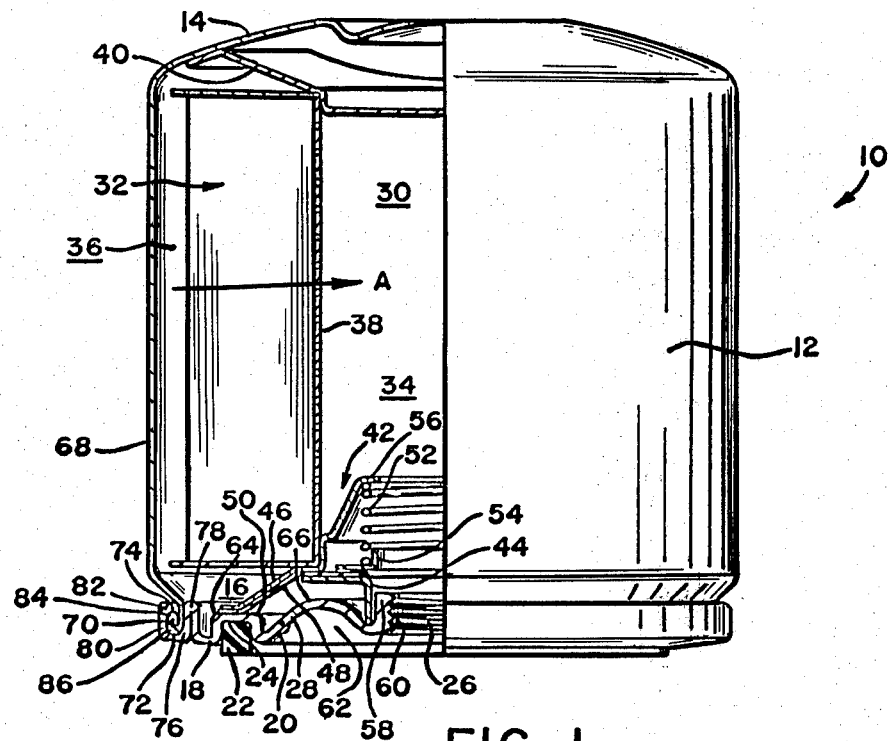
FIG. 1 is a view, partially in cross-section, of a filter embodying our invention.

FIG. 1 shows a filter 10 which includes an outer metal shell or cup-shaped housing 12 which has a closed end 14 and an open end 16 which is closed by a closure member or cap generally indicated by the numeral 18. The outer face 20 of member 18 carries an annular seal 22 which is received in an annular recess 24 and which engages with the engine on which the filter 10 is installed to prevent fluid from leaking at the interface between the filter and the engine. The closure member 18 is provided with a threaded opening 26 which may be screwed onto a supporting stem or stud carried by the engine when the filter is installed thereon. The opening 26 also serves as an outlet port for the filter 10. Openings 28 are spaced circumferentially around the member 18 to serve as inlet ports.

Cup-shaped member 12 and closure member 18 define a chamber 30. An annular, cylindrical, pleated-paper filtering media 32 is received in chamber 30. The filter media 32 divides chamber 30 into a first compartment 34 and a second compartment 36. Filter media 32 includes a center tube 38 and is supported by an annular spring 40 which engages the closed end 14 of cup-shaped member 12 and which urges media 32 downward onto an assembly generally designated by the numeral 42, which comprises anti-drain-back and relief valves. Assembly 42 is itself supported by an annular member 44 which rests upon closure member 18. The closure member 18, the assembly 42, the annular member 44, the cup-shaped member 12 and the spring 40 cooperate to define a flow path communicating inlet ports 28 to compartment 36. The anti-drain-back valve portion of assembly 42 includes resilient fingers 46 which bias a yieldable diaphragm 48 into circumferential sealing engagement at its outer periphery with an inner surface 50 of the closure member 18 to form a pressure-responsive one-way valve. When the engine is in operation, the anti-drainback valve is forced open by engine oil pressure and oil is forced through the filtering media 32 in the direction of arrow A by the engine oil pressure so that the oil is filtered as it passes through the media 32 and is communicated to the outlet 26 via the compartment 34 defined within the center tube 38. The relief valve portion of assembly 42 includes a spring 52 and a flanged ring member 54 which together urge the yieldable diaphragm 48 into circumferential sealing engagement at its inner margin with the member 44. Member 44 includes holes (not shown) which communicate inlet port 28 with outlet 26 and which are closed by diaphragm 48. Should the filter element 32 become clogged, the engine oil pressure overcomes the bias of spring 52 on diaphragm 48 which yields to allow oil to flow from the inlets 28 to the outlet 26. An annular member 56 supports the upper end of spring 52. Member 56 is received between the filter element 32 and the diphragm 48 and defines resilient fingers 46 at its outer periphery.

The closure member 18 is a single stamped member of substantially uniform thickness and includes an annular lip 58 which surrounds the opening 26 and in which screw threads 60 are formed. A first annular recess 62 is formed radially outwardly of opening 26 and openings 28 communicate recess 62 with compartment 36. A second annular recess 24 is formed radially outwardly of recess 62 and receives the sealing member 22. Because the closure member 18 is substantially uniform in thickness, the recesses 24 and 62 cause the closure member to define protrusions 64 and 66, respectively, which extend opposite the recesses and into the chamber 16 of the filter. A portion of protrusion 64 defines the surface 60 with which diaphragm 48 cooperates to form the anti-drain-back valve.

Cup-shaped member 12 includes a relatively thin side wall 68. In order to join the cup-shaped member and the closure member together, a bead 70 is formed in the sidewall 68 at the open end of the cup-shaped member. The bead 70 defines the marginal edge 72 of the cup-shaped member and also defines a shoulder 74. The closure member 18 includes a marginal edge 76 which includes a pair of opposed annular flanges 78 and 80 projecting perpendicularly to the plane of the closure member and generally parallel to the side wall 68 of the cup-shaped member. Inner flange 78 extends into the chamber 30 of filter 10 adjacent the side wall 68 of the cup-shaped member 12. The outer annular flange 80 extends parallel to flange 78 and is spaced radially outwardly of the inner flange. The marginal edge 72 and bead 70 of the cup-shaped member are received between the flanges 78 and 80. Flange 80 terminates in a portion 82 which extends radially inwardly toward the side wall 68 of the cup-shaped member 12 so that the outer flange defines an annular cavity 84 which receives bead 70.

A permanent, fluid-tight joint is formed between the member by crimping the flanges 78 and 80 against the bead 70. Additionally, the portion 82 of outer flange 80 is crimped downward against the shoulder 74 defined by bead 70 so that the marginal edge 72 of the cup-shaped member is forced downward and tightly against a surface 86 of the closure member between the flanges 78 and 80. The flange 80 is substantially the same thickness as the remainder of the closure member 18 and is, therefore, substantially thicker than the cup-shaped member 12. Flange 78 is about twice as thick as the rest of the closure member because it is defined by a portion of the closure member which extends into the chamber 30 of the filter and is bent to fold back on itself. During the crimping operation, the flange 78, which is very strong because of its double thickness, supports the relatively thin side wall of the cup-shaped member so that a strong and fluid-tight crimped joint is formed between the members.

Figure 2:
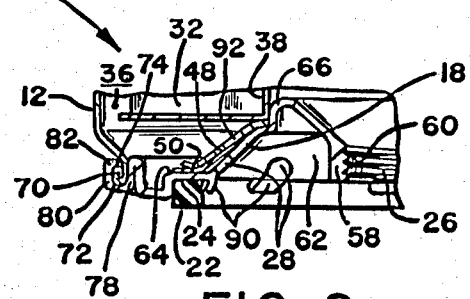
FIG. 2 is a fragmentary cross-sectional view of an alternative embodiment of our invention.

FIG. 2 illustrates another embodiment of our invention, which, with the exception of features to be hereinafter explained, is the same as the FIG. 1 embodiment. Thus, the same reference numerals are used throughout to designate analogous components or features. In the embodiment of FIG. 2, closure member 18 includes an opening 26 defined by a lip 58 in which screw threads 60 are formed. Lip 58 extends outwardly away from the closed end 14 of the housing 12. In order to support the filter element 32, closure member 18 defines a protrusion 66 which extends into the chamber 30 to define a shoulder which carries the lower end of the filter element 32. The closure member portion which defines protrusion 66 also defines a recess 62. Another recess 24 is defined by the closure member radially outwardly from recess 62. Recess 24 receives an annular sealing member 22. Because the closure member is of substantially uniform thickness, the portion which defines recess 24 also defines a protrusion 64 which extends into the chamber 30 of the filter housing 12. In order to retain seal 22 in recess 24, a number of tabs 90 are punched from the closure member and remain attached thereto at an edge of each tab. Each tab 90 is folded partially back and engages the seal 22 at an edge of the tab which is opposite from the tab edge attached to the closure member. Where the tabs 90 have been folded out of the closure member, the member defines openings 28 which communicate recess 62 with compartment 36. An anti-drain-back valve is defined by an annular diaphragm 48 and by an annular spring 92, both of which are carried on shoulder between the closure member 18 and the filter element 32. The spring 92 urges the diaphragm 48 into sealing engagement at its outer periphery with a surface 50 defined by protrusion 64 of the closure member. As with the embodiment illustrated in FIG. 1, the closure member 18 includes a pair of opposed annular flanges 78 and 80, which are crimped to form a permanent fluid-tight joint with the cup-shaped member.

Figure 3:
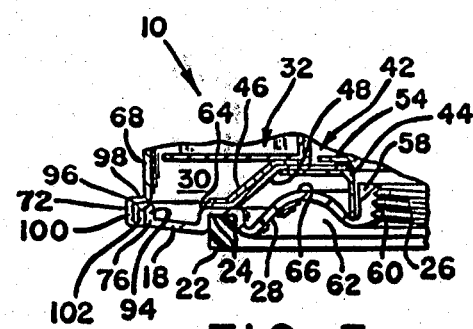
FIG. 3 is a fragmentary cross-sectional view of yet another embodiment of our invention.
Figure 4:
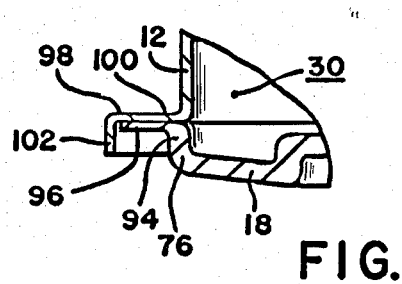
FIG. 4 is an enlarged fragmentary cross-sectional view of the embodiment illustrated in FIG. 3 at an intermediate step of manufacture.

FIGS. 3 and 4 illustrate yet another embodiment of our invention in which the same reference numerals are used to designate components or features analogous in function to those of the embodiment illustrated by FIG. 1. The closure member 18, illustrated in FIG. 3, is of generally uniform thickness and is substantially thicker than the side wall 68 of the cup-shaped member 12. Similar to the closure member of the embodiment illustrated in FIG. 1, closure member 18 carries an annular sealing member 22, defines recesses 24 and 62, and protrusions 64 and 66, and includes a lip 58 in which screw threads 60 are formed. A plurality of inlets 28 are defined by the closure member around an outlet 26. However, the marginal edge 76 of the closure member 18 includes a circumferentially extending portion 94, which is substantially the same thickness as the rest of the closure member, and a thin portion 96, which is thinner than the rest of the closure member and substantially the same thickness as the side wall 68 of the cup-shaped member 12. The marginal edge 72 of the housing 12 includes an outwardly extending flange 98. By folding the thin portion 96 of the closure member and the flange 98 of the housing tightly together and against the thick, circumferentially extending portion 94 of the closure member, a permanent, fluid-tight joint is formed between the members.

FIG. 4 illustrates the filter at an intermediate step of its manufacture and preparatory to the joining of the members. The marginal edge 72 of the closure member 18 is formed by stamping the closure member to form the circumferentially extending portion 94 having the thin portion 96 extending radially outwardly therefrom. At this step of manufacture, the flange 98 of the cup-shaped member is L-shaped in cross-section and includes a first leg 100 extending radially outwardly and terminating in a second leg 102 which extends from the first leg 100 parallel to side wall 68 and away from the closed end 14 of the housing. Those skilled in the art will recognize that the members are joined to their FIG. 3 condition by bending the second leg 102 of flange 98 and around the end of the thin portion 96 of closure member 18 so that the second leg extends radially inward toward the center of the closure member. The first leg 100 of flange 98 and the thin portion 96 of closure member 18 are then bent together so that the second leg 102 of the flange 98 is crimped tightly against the thick circumferentially extending portion 94 of the marginal edge of closure member 18. As FIG. 3 illustrates, the thick portion 94 and the thin portion 96 of the marginal edge of closure member 18 define an inverted U-shape in cross-section. The second leg 102 of the flange 98 is crimped between the vertical portions of the U-shape and the first leg 100 of the flange is wrapped around the outside of the U-shape.

During the crimping operation, the thick portion 94 of the marginal edge of closure member 18 supports the thinner parts so that they may be crimped together to form a permanent, fluid-tight joint between the members.

The use of a filter according to our invention corresponds exactly to the use of prior filters of this class and no further explanation to those ordinarily skilled in the art is deemed necessary.

We claim:

1. A method of making an oil filter housing characterized by the steps of:
   a. providing a cup-shaped housing member having an open end and a marginal edge defining the opening into said cup-shaped member;
   b. forming a bead at the marginal edge of said cup-shaped member;
   c. providing a stamped closure member consisting of a single member having a substantially uniform thickness and a pair of spaced apart annular flanges at the marginal edge thereof, said pair of flanges extending substantially perpendicularly to the plane of said closure member and defining an annular bead-receiving cavity;
   d. forming the first of said pair of annular flanges by bending the marginal edge of the closure member so that it extends perpendicularly to the plane of said closure member and then ending said edge back on itself;
   e. placing said cup-shaped member marginal edge between said pair of annular flanges and placing said bead in said annular cavity whereby said closure member closes said opening; and
   f. crimping the outermost of said flanges into permanent fluid-tight engagement with the bead of the marginal edge of said cup-shaped member.

2. The member of claim 1 including the step of forming the second of said pair of annular flanges by bending the edge of said closure member radially outward of said first annular flange and then upward from the plane of said closure member so that the edge extends parallel to said first flange.

3. The method of making an oil filter housing characterized by the steps of:
   a. providing a cup-shaped member having an open end, a circumferentially-extending wall, and a marginal edge defining the opening in said cup-shaped member;
   b. providing an L-shaped flange circumscribing the marginal edge of said cup-shaped member, said L-shaped flange including a first leg extending radially outward and a second leg extending from said first leg parallel to said circumferentially-extending wall and away from the closed end of said cup-shaped member;
   c. providing a stamped closure member consisting of a single member having a thickness substantially greater than said cup-shaped member, said closure member having a marginal edge with a thin portion thereof being of substantially the same thickness as the circumferentially-extending wall of said cup-shaped member;
   d. placing the thin marginal edge of said closure member into engagement with said first leg of said L-shaped flange so that the closure member closed the open end of the cup-shaped member; bending the second leg of the L-shaped flange around the edge of the thin portion of said closure member so that the second leg extends radially inward toward the center of the closure member; and
   e. bending both the first leg of said flange and the thin portion of said closure member downward so that said second leg of said L-shaped flange is crimped between the thin portion of said closure member and the circumferentially-extending thick portion thereof.

* * * * *